(12) United States Patent
Cimberio et al.

(10) Patent No.: US 12,044,336 B2
(45) Date of Patent: Jul. 23, 2024

(54) COMPONENT WITH PRESS FITTING

(71) Applicant: FIMCIM S.p.A., Milan (IT)

(72) Inventors: Roberto Cimberio, Vacciago (IT);
Tiziano Guidetti, Borgomanero (IT)

(73) Assignee: FIMCIM S.P.A., Milan (IT)

( * ) Notice: Subject to any disclaimer, the term of this patent is extended or adjusted under 35 U.S.C. 154(b) by 104 days.

(21) Appl. No.: 17/827,206

(22) Filed: May 27, 2022

(65) Prior Publication Data

US 2022/0381378 A1    Dec. 1, 2022

(30) Foreign Application Priority Data

May 28, 2021    (IT) .................... 102021000014102

(51) Int. Cl.
*F16L 13/14*    (2006.01)
*F16L 37/091*    (2006.01)

(52) U.S. Cl.
CPC .......... *F16L 13/142* (2013.01); *F16L 37/091* (2013.01)

(58) Field of Classification Search
CPC ....... F16L 13/142; F16L 13/141; F16L 13/14; F16L 13/161; F16L 37/091; F16L 37/33; F16L 37/407; F16K 27/067
See application file for complete search history.

(56) References Cited

U.S. PATENT DOCUMENTS

| | | | |
|---|---|---|---|
| 3,368,830 A | 2/1968 | French | |
| 3,501,178 A * | 3/1970 | Sewell | ............... F16L 13/142 |
| 4,126,339 A | 11/1978 | Thompson | |
| 4,408,786 A * | 10/1983 | Stuemky | |
| 6,805,385 B2 | 10/2004 | Viegener | |
| 8,118,331 B2 * | 2/2012 | Yamashita | |
| 8,517,431 B2 | 8/2013 | Arning et al. | |
| 9,234,611 B2 | 1/2016 | Arning et al. | |
| 2001/0020691 A1 * | 9/2001 | Woods | ................. F16K 27/067 |
| 2008/0111369 A1 * | 5/2008 | Pettinaroli | ............ F16L 13/142 |
| 2008/0149873 A1 * | 6/2008 | Cimberio | .............. F16K 27/067 |
| 2010/0133808 A1 | 6/2010 | Castiglioni et al. | |
| 2011/0138605 A1 | 6/2011 | Swift et al. | |

(Continued)

FOREIGN PATENT DOCUMENTS

DE    10 2004 031247    4/2005
EP    0 922 896    6/1999

(Continued)

OTHER PUBLICATIONS

Extended European Search Report cited in EP 22170989.2 mailed May 25, 2022, 10 pages.

(Continued)

*Primary Examiner* — William S. Choi
(74) *Attorney, Agent, or Firm* — Nixon & Vanderhye P.C.

(57) ABSTRACT

A press-fitting component (1) including at least one main body (2) having at least one inlet (4), at least one outlet (5) and at least one channel (3) connecting the inlet (4) with the outlet (5), as well as at least one press-fitting (90) defined in correspondence of at least one of the outlet (5) and the inlet (4) of the main body (2). The press fitting further comprises a predetermined number of projections (9) emerging internally from the main body (2) and made in one piece with the main body (2). A process of assembling the component (1) with a pipe and a process of manufacturing the component (1).

20 Claims, 4 Drawing Sheets

(56) References Cited

U.S. PATENT DOCUMENTS

| | | |
|---|---|---|
| 2018/0051834 A1 | 2/2018 | Hofmann |
| 2018/0313480 A1* | 11/2018 | Lawrence ............ F16L 13/142 |
| 2018/0356020 A1 | 12/2018 | Zavorka et al. |
| 2020/0300391 A1 | 9/2020 | Paige et al. |

FOREIGN PATENT DOCUMENTS

| | | | |
|---|---|---|---|
| EP | 1245892 A1 * | 10/2002 | ............ F16L 13/143 |
| EP | 1 431 643 | 6/2004 | |
| EP | 1 441 165 | 7/2004 | |
| EP | 2 394 087 | 12/2011 | |
| EP | 3 265 711 | 1/2018 | |

OTHER PUBLICATIONS

Search Report for Italian Patent Application No. 102021000014102, dated Feb. 15, 2022, 10 pages.

\* cited by examiner

COMPONENT WITH PRESS FITTING

RELATED APPLICATION

This application incorporates by reference in its entirety and claims priority to Italian patent application 102021000014102, filed May 28, 2021.

FIELD

The present invention concerns a component with a press fitting and a process of assembling said component with a pipe or a tubular portion of a further component; a manufacturing process of the component is also described.

For example, the component may be a component for hydronic networks and may comprise a valve, a tap, a pressure reducer, or a section of a pipe.

The component of the invention is for example used in hydraulic and/or thermo-hydraulic plants for the distribution of liquids.

BACKGROUND

In fluid distribution plants, hydraulic components such as valves or taps are known to have press fittings used to permanently connect the component to a pipe or a sleeve. Each press fitting is connected to the respective pipe following the insertion thereof into one end of the press fitting and then performing a clamping action on that end with a specific clamp, so as to mechanically constrain the two elements.

An example of component comprising a press fitting is described in patent U.S. Pat. No. 8,517,431B2, which comprises a main body configured to receive in insertion at least one end portion of a pipe or sleeve, as well as a locking ring fitted on the main body and having a plurality of hook elements suitable for axially and torsionally constraining the pipe.

A problem shown by these types of components with press fittings lies in the high constructive complexity and in the associated manufacturing and assembly costs. Moreover, the component with press fitting described in U.S. Pat. No. 8,517,431B2 is not devoid from fluid leakages, having indeed a reduced operational reliability due to the high degree of wear to which it is subject.

SUMMARY

Aspects of the invention are described below.

In a 1st aspect is provided a component with press fitting comprising:
- at least one main body (2) having at least one inlet (4), at least one outlet (5) and at least one channel (3) placing in fluid communication the inlet (4) with the outlet (5),
- at least one press fitting (90) in correspondence of at least one of the outlet (5) and the inlet (4) of the main body (2),
- wherein the press fitting (90) comprises a predetermined number of projections (9a) emerging internally from the main body (2) and made in one piece with the main body (2).

In a 2nd aspect according to the preceding aspect, the component comprises a plurality of projections (9a) emerging from the main body (2) offset from each other of an angle comprised between 5° and 120°, optionally between and 10° and 60°.

In a 3rd aspect according to any one of the preceding aspects each projection (9a) emerges radially from an inner surface of the main body.

In a 4th aspect according to the preceding aspect, the inner surface of the main body, in interposition between two adjacent projections (9a), has, in cross-section, a substantially V-shaped conformation.

In a 5th aspect according to any one of the two preceding aspects, the inner surface of the main body (2), at a section in interposition between two adjacent projections (9a), is defined by two surfaces radially converging away from the channel (3).

In a 6th aspect according to the preceding aspect, the surfaces defining the inner surface of the main body (2) extend from a respective projection (9a) towards an intermediate area to said adjacent projections (9a), defining a connecting section.

In a 7th aspect according to any one of the preceding aspects each projection (9a) extends along a direction substantially parallel to an axis of symmetry (X) of the main body or to a longitudinal direction of prevalent extension of the main body, from at least one of the inlet (4) and the outlet (5), towards a central area of the main body (2).

In an 8th aspect according to the preceding aspect the longitudinal extension of each projection (9a) is comprised between 2 mm and 10 mm.

In a 9th aspect according to any one of the preceding aspects each projection (9a) is bounded by a top wall (23b), opposite to/an inner surface of the main body and having a tapered conformation proceeding radially in approach to the axis (X).

In a 10th aspect according to any one of the preceding aspects each projection (9a) has an end wall (23a) transverse to an axis (X), and in particular transverse to the top wall (23b).

In an 11th aspect according to the preceding aspect the end wall (23a) is arranged at the inlet (4) or the outlet (5) and has a tapered conformation approaching the axis (X).

In a 12th aspect according to any one of the preceding aspects each projection (9a) has a terminal wall (22a) transverse to the axis (X) and in particular transvers to the top wall (23b) and opposite the end wall (23a).

In a 13th aspect according to the preceding aspect, the terminal wall (22a) defines a sharp edge at a junction section with the top wall (23b).

In a 14th aspect according to any one of the preceding aspects the press fitting comprises at least one inner groove (11) defined on an inner surface of the main body (2) transverse to the axis (X).

In a 15th aspect according to the preceding aspect the inner groove (11) has an annular conformation and is adjacent to the projections (9a), optionally to the terminal wall (22a) of each projection (9a).

In a 16th aspect according to any one of the two preceding aspects, the inner groove (11) has a longitudinal extension along the axis (X) comprised between 3 mm and 15 mm.

In a 17th aspect according to any one of the three preceding aspects the inner groove extends in depth radially away from the axis (X) by a quantity comprised between 0.4 mm and 3 mm.

In an 18th aspect according to any one of the four preceding aspects, the inner groove (11) has, in longitudinal cross section, a rectangular shape.

In a 19th aspect according to any one of the preceding aspects the press fitting comprises at least one gasket (12) having a substantially annular conformation.

In a 20th aspect according to the preceding aspect, the gasket (12) has:

a predetermined longitudinal extension along the axis (X) comprised between 3 mm and 15 mm, and/or a predetermined thickness measured orthogonally to the axis (X) (i.e. orthogonally to the inner surface of the main body) comprised between 1 mm and 5 mm.

In a 21st aspect according to any one of the two preceding aspects, the gasket (12) is at least partially counter-shaped to the inner groove (11) and at least partially housed within the same inner groove (11).

In a 22nd aspect according to any one of the three preceding aspects, the gasket (12) has in a cross section along a radial plane, a polygonal shape, optionally rectangular shape.

In a 23rd aspect according to any one of the preceding aspects the ratio between the depth of the inner groove (11) to the thickness of the gasket (12) is comprised between 0.1 and 0.9, optionally comprised between 0.2 and 0.6.

In a 24th aspect according to any one of the preceding aspects, the component (1) comprises a predetermined number of internal projections (9b), each of which is distinct, spaced and optionally aligned along a direction parallel to the axis (X) relative to a respective one of said projections (9a).

In a 25th aspect according to the preceding aspect each of said internal projections (9b) has a respective terminal wall (22b) and wherein the terminal wall of each of said projections (9a) and each of said internal projections (9b) faces the inner groove (11).

In a 26th aspect according to any one of the preceding aspects, the component (1) comprises an outer groove (13) defined on an outer surface of the main body (2) on at least one between the inlet (4) and the outlet (5) of the main body (2).

In a 27th aspect according to the preceding aspect the outer groove (13) is axially offset to the inner groove (11) along a direction parallel to the axis (X), in interposition between a central area of the main body (2) and the press fitting.

In a 30th aspect according to any one of the preceding aspects the press fitting has a gripping edge (14) in correspondence of at least one of the inlet (4) and the outlet (5), said gripping edge (14) being configured for deforming radially approaching the axis (X).

In a 31st aspect according to the preceding aspect the gripping edge (14) extends in width along the axis (X) by a quantity comprised between 10 mm and 30 mm.

In a 32nd aspect according to any one of the preceding two aspects, the gripping edge (14) has a plurality of protuberances (15) radially emerging from an outer surface of the main body (2) opposite the channel (3).

In a 33rd aspect according to the preceding aspect the protuberances (15) are angularly offset from each other by an angle comprised between 5° and 120°, optionally between and 10° and 60°.

In a 34th aspect according to any one of the two preceding aspects the protuberances (15) are circumferentially spaced from each other by grooves (17) extending parallel to the axis (X) over the entire width of the gripping edge (14).

In a 35th aspect according to the preceding aspect the grooves include first grooves and second grooves alternating with each other.

In a 36th aspect according to the preceding aspect the first grooves have a depth greater than a depth of the second grooves and wherein the first grooves have a width lower than a width of the second grooves, said depth being measured radially and said width being measured circumferentially.

In a 37th aspect according to any one of the preceding aspects, the component (1) comprises a press fitting at each one of the inlet (4) and the outlet (5).

In a 38th aspect according to any one of the preceding aspects, the component (1) comprises at least two outer grooves (13) each defined in interposition between a respective press fitting and a central area of the main body (2).

In a 39th aspect according to any one of the preceding aspects the main body (2) is defined by two elements (2a, 2b) which are distinct from each other and fluid-tight engaged by means of a threaded coupling.

In a 40th aspect according to the preceding aspect each of the elements (2a, 2b) has a tapered conformation along the direction of said axis (X), in particular wherein both an inner surface and an outer surface of each of said first and second elements (2a, 2b) of the main body (2) are tapered along the direction of said axis (X).

In a 41st aspect according to any one of the preceding aspects, the component (1) comprises at least one shutter (10) inside the channel in the main body (2), optionally at a central area of the main body (2), selectively movable between at least one open position and one closed position.

In a 42nd aspect according to the preceding aspect, the shutter (10) is a ball body provided with at least one through opening, said shutter (10), in the closed position, preventing the passage of fluid between the inlet (4) and the outlet (5), and wherein said shutter in the open position allows the passage of fluid between the inlet (4) and the outlet (5).

In a 43rd aspect according to any one of the preceding aspects, the component (1) comprises at least one operating rod (20) crossing the main body (2) and engaging a/the shutter (10), said operating rod (20) being configured for moving the shutter (10) between the open position to the closed position and vice versa.

In an aspect 44th according to any one of the preceding aspects 42 to 44, the component (1) comprises at least one control member (21) integrally movable by rotation with the shutter and a/the operating rod, said control member (21) being configured for moving the shutter (10) between the first and second operating positions and vice versa, following a rotation of the same control member by a user.

In a 45th aspect according to any one of the preceding aspects, the component comprises a tubular collar (19) joined in one piece to the main body (2) and emerging externally to the latter.

In a 46th aspect according to the preceding aspect, the tubular collar (19) is configured for housing and fluid-tightly engaging a portion of the operating rod (20), in particular wherein the tubular collar houses at least one sealing element radially interposed between the tubular collar itself and the operating rod (20).

In a 47th aspect according to any one of the preceding aspects the main body (2) is made of metallic material, for example cast iron.

In a 48th aspect a process of manufacturing a component with press fitting according to any one of the preceding aspects is provided.

In a 49th aspect according to the preceding aspect, the process comprises making the elements (2a, 2b) by molding; said molding process comprising a step of providing a mold at least partially counter-shaped to the outer surface of at least one of the elements (2a, 2b) to be molded.

In a 50th aspect according to the preceding aspect the process includes the steps of:

inserting at least one punch or other insert, which is at least partially countershaped to the inner surface of one of the elements (2a, 2b) for defining a cavity in interposition between the mold and the punch, inserting a predetermined amount of molding material, e.g. metallic material at liquid state such as cast iron, into the cavity, closing the mold, waiting for the solidification of the metal material placed in the cavity, and removing one of the elements (2a, 2b) obtained from the mold.

In a 51st aspect according to the 48th aspect the step of providing the mold comprises at least the sub-steps of:

providing two shells at least partially countershaped to the outer surface of one of the elements (2a, 2b);

placing the two shells in contact with each other to define a hollow mold;

placing a predetermined amount of molding material, e.g. metallic material at liquid state such as cast iron, into the cavity, and waiting the solidification of the metal material placed in a cavity of the mold.

In a 52nd aspect according to the preceding aspect, the process comprises, following the solidification step, at least one step of removing the shells from one of the molded elements (2a, 2b).

In a 53rd aspect according to any one of the preceding aspects from the 48th to the 52nd, the process comprises a step of making the inner groove (11) on the inner surface of the elements (2a, 2b) at the inlet (4) and optionally the outlet (5), in particular said inner groove (11) being made by means of material removal, optionally turning, of the elements (2a, 2b).

In a 54th aspect according to any one of the preceding aspects from 48th to 53rd, the process comprises a step of making the outer groove (13) on the outer surface of the elements (2a, 2b) at the inlet (4) and optionally the outlet (5), in particular said inner groove (11) being made by means of removal of material, optionally turning, of the elements (2a, 2b).

In a 55th aspect according to any one of the preceding aspects from the 48th to the 54th, the process comprises a step of making the seat (25) of the element (2a) or the element (2b) by removal of material, optionally by turning, from the outer surface of the elements (2a, 2b).

In a 56th aspect according to any one of the preceding aspects from the 48th to the 55th, the process comprises a step of engaging the gasket (12) inside each inner groove (11).

In a 57th aspect according to any one of the preceding aspects from the 48th to the 56th, the component is a valve, said process further comprising the steps of:

engaging the operating rod inside the tubular collar (19) in a fluid-tight manner, engaging a sealing element (10a) inside the seat (25) of the element (2a) or the element (2b), inserting the shutter (10) inside the seat (25) in engagement with the tubular collar (19), engaging a further sealing element (10a) inside the seat (25) of the other (i.e. one which has not already received a sealing element (10a)) between the element (2a) or the element (2b), engaging the elements (2a, 2b) with each other in a fluid-tight manner, and engaging the control member (21) to the operating rod (20).

BRIEF DESCRIPTION OF THE DRAWINGS

Embodiments and aspects of the invention will be described below with reference to the accompanying figures, which are provided for illustrative purposes only and are therefore not limitative.

DETAILED DESCRIPTION

Component with Press Fitting

Figure 1:
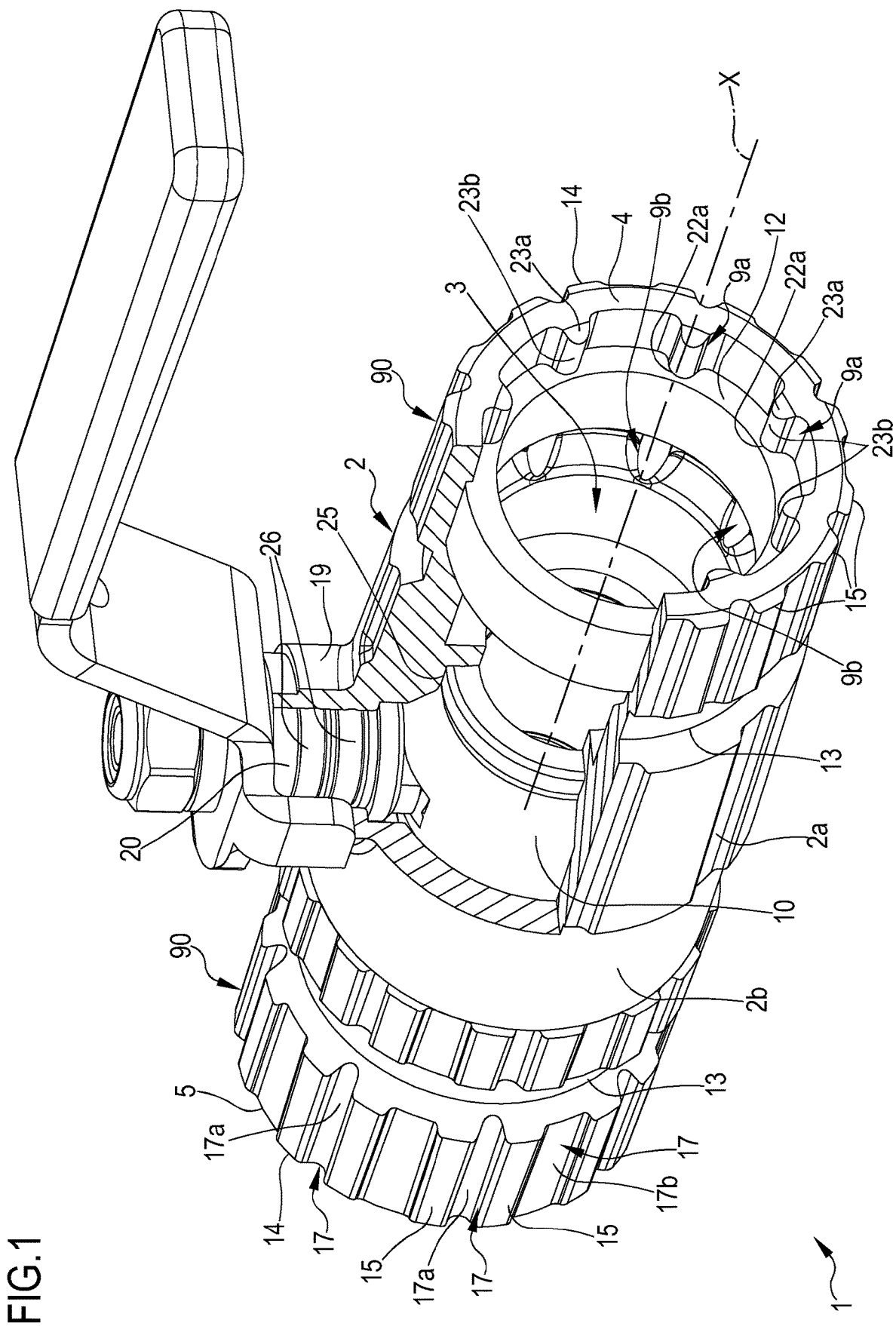
FIG. 1 is a perspective view, partially in cutaway, of the component with press fitting according to aspects of the present invention.

A press fitting component according to aspects of the present invention, which can be used, for example, in hydraulic and/or thermohydraulic plants for fluid distribution, is collectively referred to as 1. As for example shown in FIG. 1, the component comprises a main body 2 having at least one channel 3 in fluid communication between an inlet 4 and an outlet 5. In the accompanying figures, a main body 2 extending along a rectilinear axis of symmetry or of prevalent extension X is shown: however, it is not excluded that the main body of the component 1 may have one or more curvilinear sections extending therefore along a curvilinear trajectory. Moreover, although in the present description reference is made to a component of the type having two ways and therefore with a single channel 3, it is not excluded that the component may have three or more ways and therefore more than one channel 3. In the following an example of a component comprising a manually operated tap is described: however, the component 1 may alternatively comprise a valve, a pressure reducer, a simple section of tubing, or one or more other members.

Figure 2:
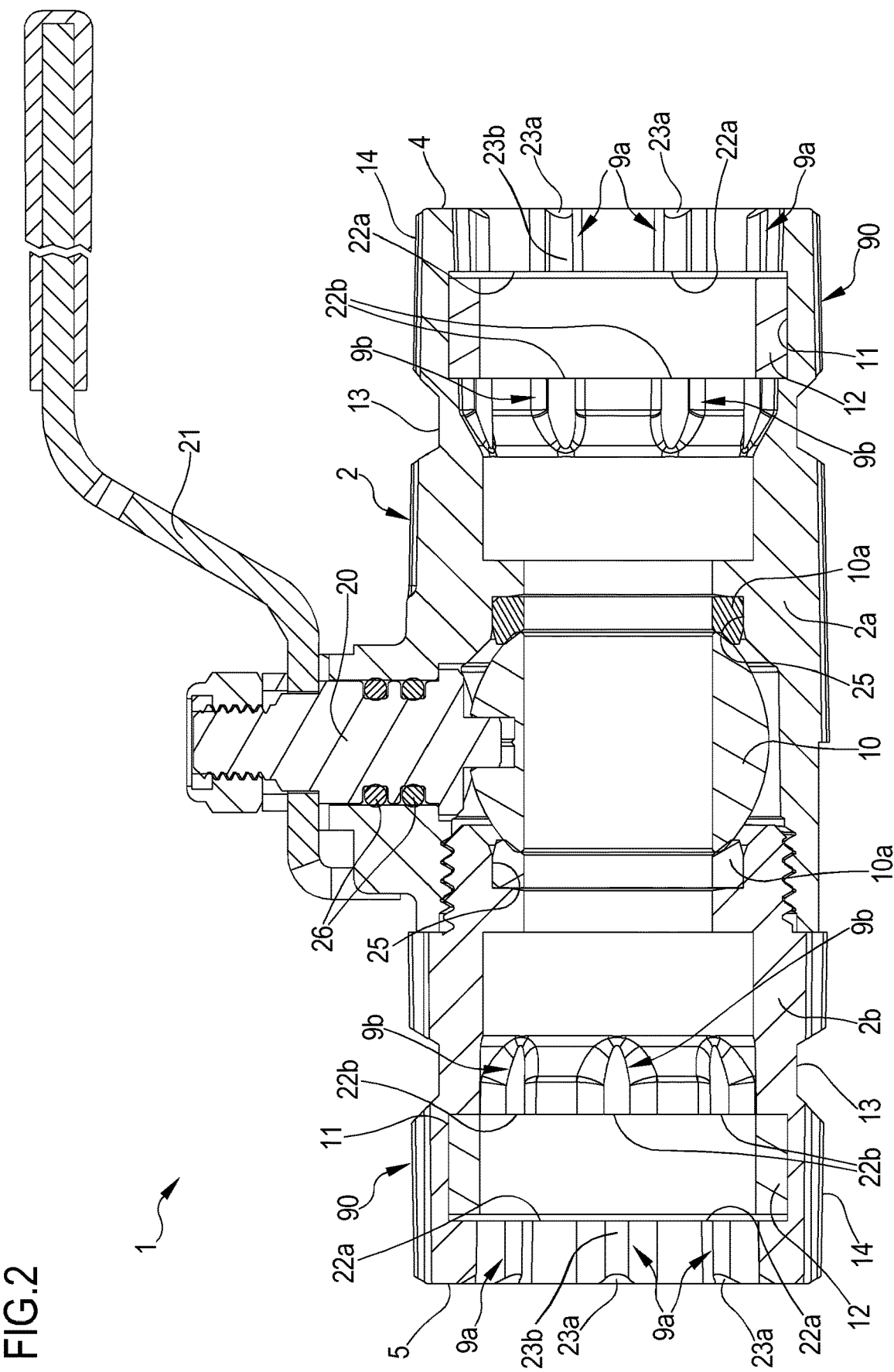
FIG. 2 is a longitudinal cross-sectional view of the component with press fitting of FIG. 1.

As, for example, shown in FIG. 2, the main body 2 may be defined by two elements 2a, 2b engaged with each other in a fluid-tight manner by means of a threaded coupling. The main body 2 in two elements 2a, 2b is appropriate for allowing an easy installation of a shutter 10 and of an operating rod 20 of a valve subsequently detailed. The main body 2 also has a seat 25 defined in cooperation between the elements 2a, 2b and configured for housing the shutter 10. In correspondence of the seat 25 there are sealing rings 10a which are axially spaced apart the one from the other.

It should be noted that each element 2a, 2b of the main body 2 has a tapered conformation along the X axis for allowing it to be manufactured by a casting or die-casting processes and for allowing the casted product to be extracted from e.g., a tubular mold with no need of molds formed by half-shells.

In the accompanying figures, a main body 2 defined by elements 2a, 2b is: however, a component consisting of a single main body is not excluded.

The component 1 may further comprise an outer groove 13 defined on an outer surface of the main body 2 at a predetermined distance from at least one of the inlet 4 and the outlet 5 of the main body 2. As for example shown in FIG. 1, the outer groove 13 has an annular conformation and is defined by an indent extending radially in a direction approaching the X axis: an outer groove is positioned between a central zone of the main body 2 and each of the press fittings 90 at the inlet 4 and the outlet 5, as subsequently detailed. Each outer groove 13 thus separates a central zone of the main body from the actual press fitting 90, allowing a user to visually distinguish the various parts of the main body 2, and in particular highlighting the zone of the press fitting to be deformed when installing the component 1. As already mentioned, the component 1 may comprise at least two outer grooves 13, one defined in proximity to and at a predetermined distance from the inlet 4 and one defined in proximity to and at a predetermined distance from the outlet 5.

Each press fitting 90 is without internal or external threads: this allows the component press fittings to be deformed and be thus able to constrain (by mechanical interference) a pipe that can be at least partially inserted inside the main body 2. In detail, the press fitting achieves a mechanical coupling following a deformation by means of a pressing member (for example a suitable gripper) active on at least one gripping edge 14 of the press fitting itself. In particular, the gripping edge 14 defines an end portion of the press fitting 90 having a predetermined width, measured longitudinally or parallel to the X axis, for example of between 10 mm and 30 mm. The gripping edge 14 allows the pressing member to grip the press fitting 90, preventing a relative rotation between the two. For this purpose, the gripping edge 14 has a plurality of protuberances 15 radially emerging from an outer surface of the main body 2 and angularly offset from each other by an angle of, for example, comprised between 5° and 120°, optionally between and 10° and 60°.

Figure 3:
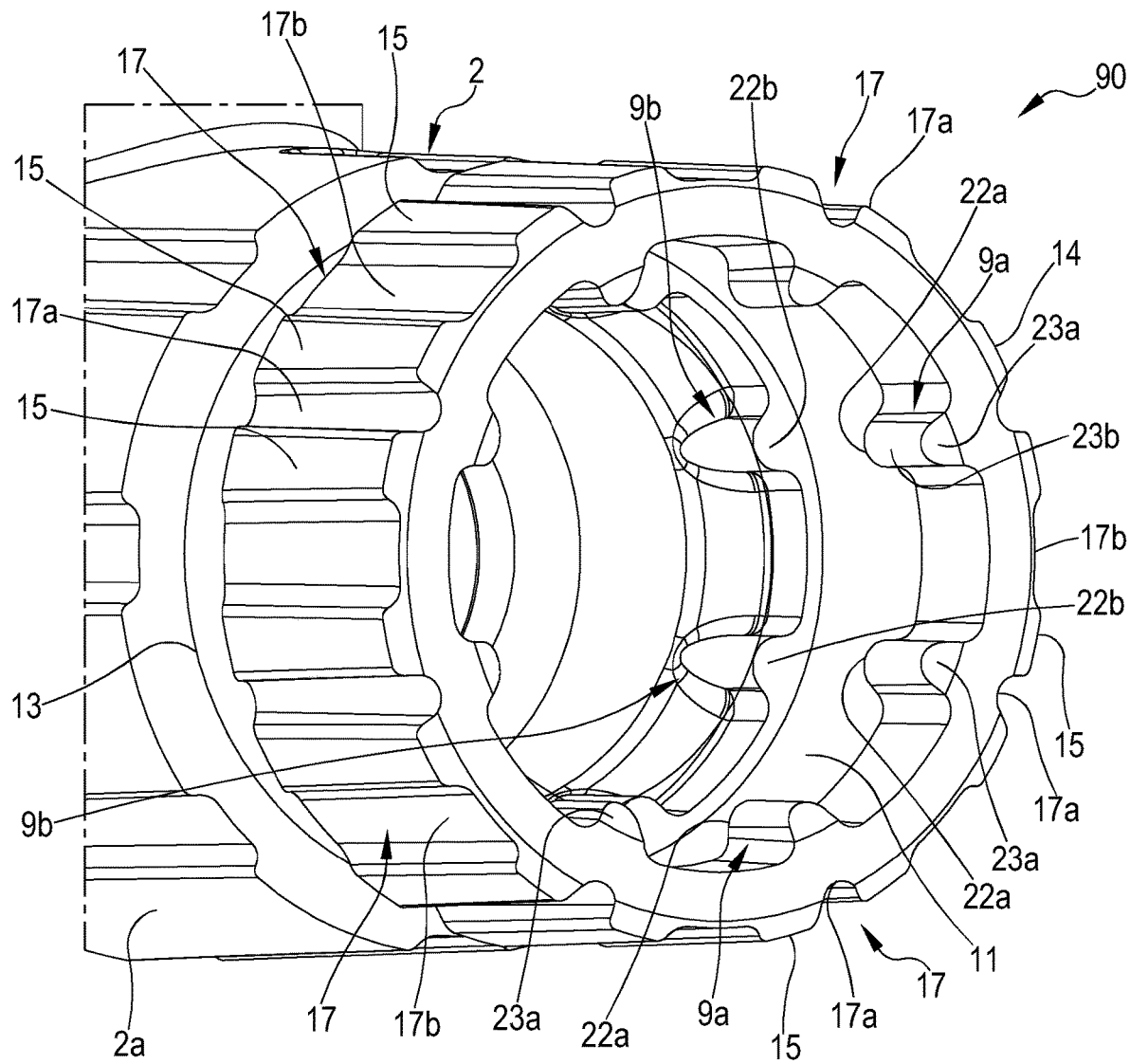
FIG. 3 is a detail view of a press fitting of the component of FIG. 1.

As shown in detail in FIG. 3, the protuberances 15 are distinct from each other and circumferentially spaced from each other by grooves 17 extending parallel to the X axis across the width of the gripping edge 14. In particular, the grooves 17 comprise alternating first grooves 17a and second grooves 17b. The first grooves 17a have a predetermined depth measured radially, greater than a depth also measured radially of the second grooves 17b, while the second grooves 17b have a width measured circumferentially to the main body 2, greater than a width (also measured circumferentially) of the first grooves 17a. It should be noted that the first grooves 17a define controlled deformation areas and allow the gripping edge 14 to collapse as a result of the deformation imposed by the pressing member, so as to achieve, following the engagement of a pipe inside the fitting 90, a substantially smooth and almost burr-free outer surface of the gripping edge 14.

Although, in the above figures, component 1 has a press fitting 90 at both inlet 4 and outlet 5, it is not excluded that a component 1 may be made having only one press fitting 90, for example at the inlet 4, and having a different type of coupling portion (for example threaded) at the outlet 5.

Moving to a description of the radially inner surface of the component 2, and as shown from FIGS. 1-3, each press fitting 90 may comprise an inner groove 11 defined on an inner surface of the main body 2: the inner groove 11 is arranged transversely to the X axis and is configured for accommodating at least in part a seal 12. The inner groove 11 of each press fitting is therefore facing the inlet 4 or the outlet 5, adjacent to projections 9a as further detailed herein below. From a dimensional point of view, the inner groove 11 has an annular conformation with a rectangular longitudinal section: the inner groove 11 is in an offset position along the X axis with respect to the outer groove 13 and is in particular placed in an area closer to the inlet opening 4 with respect to the outer groove 13 (with respect to the press fitting placed at the inlet opening) and in an area closer to the outlet opening 5 with respect to the outer groove 13 (with respect to the press fitting placed at the outlet opening). In particular, the inner groove 11 extends longitudinally along the X axis by a width comprised between 3 mm and 15 mm, while it extends radially away from the X axis by a depth comprised between 0.4 mm and 3 mm.

Each press fitting 90 may further comprise at least one gasket 12, which also has an annular shape and which is at least partially housed inside the inner groove 11: in the example of the enclosed figures, a radially outer annular half-part of the gasket 12 is housed in the inner groove 11. The gasket 12 has at least for a preponderant part of its circumferential development, in particular for the whole circumferential development, a radial section (i.e. a section obtained on a half-plane of section passing through the X axis and crossing radially the gasket 12) with a non-circular profile. In fact, as shown in FIG. 2, the gasket 12 has a radial section of substantially rectangular shape, at least partially counter-shaped to the inner groove 11. The gasket allows adhering to an external surface of the portion of pipe being inserted inside the press fitting, thus preventing fluid leakage. From a dimensional point of view, the gasket 12 extends longitudinally along the X axis by a quantity comprised between 3 mm and 15 mm and has a predetermined thickness measured orthogonally to the X axis comprised between 1 mm and 5 mm. It should be noted that the gasket emerges at least partially from the inner groove 11, thus having a thickness greater than the depth of the groove. In detail, the ratio between the depth of the groove and the thickness of the gasket is comprised between 0.1 and 0.9, for example said ratio may be comprised between 0.2 and 0.6.

The press fitting 90 further comprises a predetermined number of projections 9a radially emerging from an inner surface of the main body 2, configured for constraining the main body 2 the pipe (or the tubular section of a further component to be joined to the component 1 described herein) at least partially insertable inside the press fitting itself. In particular, the press fitting 90 comprises a plurality of projections 9a angularly offset from each other by an angle comprised between 5° and 120°, in particular between and 10° and 60°.

The projections 9a are defined in correspondence of at least one between the inlet 4 and the outlet 5 of the main body: each of the projections 9a extends longitudinally and parallel to the other projections (for example along a direction substantially parallel to the X axis) and develops from the inlet 4 or the outlet 5 approaching a central area of the main body 2. The projections may extend longitudinally from a perimeter edge delimiting the inlet 4 or the outlet 5, to at the inner groove 11 to which each projection is directly faced. Each projection for example extends longitudinally along the X axis by a quantity comprised between 2 mm and 10 mm. From a structural point of view, each projection 9a is bounded by a top wall 23b, which faces inwards from the fitting and placed on the opposite side of the inner surface of the main body: the top wall 23b has a tapered conformation radially proceeding in approach to the X axis. Each projection 9a is also transversally delimited by an end wall 23a transversal to the X axis, also preferably having a tapered conformation in approach to the X axis and configured for facilitating the insertion of the portion of pipe to be inserted inside the press fitting 90.

Each projection 9a may further comprise a terminal wall 22a on an opposite side to the end wall 23a. The terminal wall 22a extends transversal to the top wall and may define a sharp edge at a junction section with the top wall 23b of the respective projection: the sharp edge is configured for axially constraining the portion of the pipe inserted in the press fitting 90 (of course once the press fitting is radially deformed). In fact, as a result of the deformation of the press fitting, the top wall 23b and the junction section between the terminal wall 22a and the top wall 23b defining the sharp edge of each projection 9a, mechanically interfere with the pipe inserted in the press fitting 90. The top wall 23b therefore prevents a torsional displacement of the pipe, while the sharp edge prevents an axial displacement of the pipe, thus opposing to its extraction from the fitting 90.

It should be noted that the projections 9a are made in one piece with the main body 2, so as to prevent any relative displacement between the section of pipe to be inserted inside the press fitting 90 and the main body, thus increasing the reliability of the component and minimizing fluid losses due to wear of the projections themselves, as well as considerably simplifying assembly operations.

In accordance with a further aspect each one of the projections 9a extends parallel to and in radial alignment with a corresponding one of said first grooves 17a described above, such that deformation of the part of the fitting carrying the projections is facilitated during assembly of the press fitting with for example a pipe.

The component 1 may further comprise a predetermined number of internal projections 9b, each of which is distinct and spaced apart from the projections 9a. In particular, the press fitting 90 comprises a plurality of internal projections 9b angularly offset from each other by an angle comprised between 5° and 120°: each of the internal projections 9b is aligned along the X axis with a respective projection 9a and faces the inner groove 11 on an opposite side relative to the respective projection 9a: in practice, the inner groove 11 is axially interposed between a series of internal projections 9b and a series of projections 9a. More in detail, each internal projection 9b is bounded by a top wall 23b opposite to the inner surface of the main body, as well as transversely bounded by a terminal wall 22b. Note that the terminal wall 22b of the internal projection 9b also preferably defines a sharp edge at a junction section with the top wall 23b of the internal projection itself. The sharp edge of the internal projection 9b, following a deformation of the press fitting towards the X axis, axially constrains a pipe inserted in the main body, while the top wall 23b of the internal projection 9b imposes a torsional constraint on the pipe. The projection 9a and the internal projection 9b are substantially identical or at least similar in shape: both the projection 9a and the internal projection 9b are suitable for exerting an axial constraint on the pipe at the junction section between the terminal wall and the top wall 23b, as well as a torsional constraint at the top wall 23b.

As mentioned above, the deformation of the press fitting leads to a partial elastic deformation of each gasket 12, thus achieving the necessary hydraulic seal with the external surface of the portion of pipe inserted inside the press fitting 90.

Figure 4:
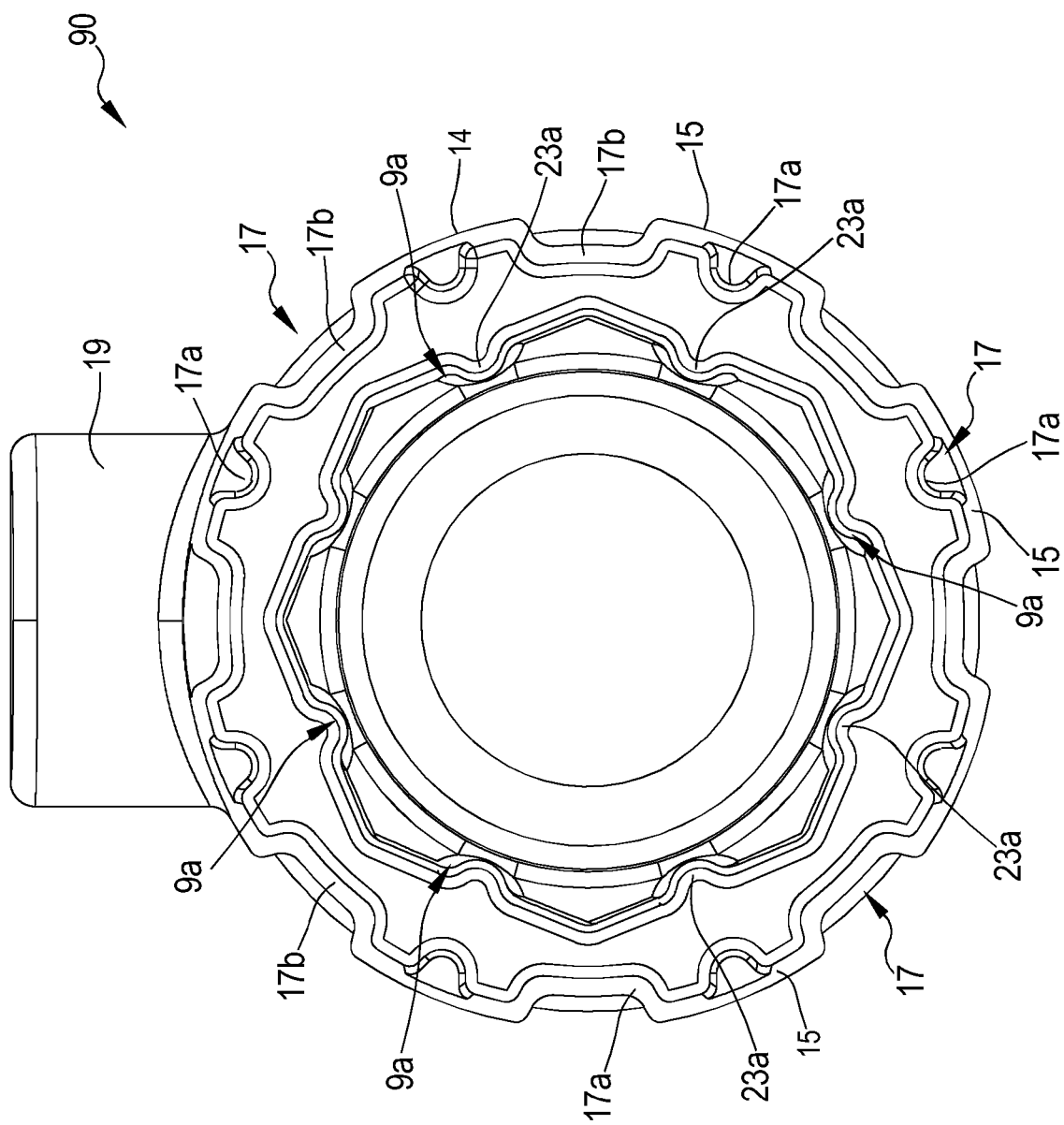
FIG. 4 is a detail view of a further embodiment of a press fitting of the component according to the present invention.

As for example shown in FIGS. 3 and 4, the inner surface of the main body may be defined by a curvilinear surface (FIG. 3) or by incident flat surfaces (FIG. 4). In the latter configuration, the inner surface of the main body 2 is defined by converging facets. Each facet extends from a respective projection 9a towards an area intermediate to an adjacent projections 9a, thus defining a connecting section delimiting a preferential deformation area during pressing of the gripping edge 14. In other words, the portions of inner surface of the main body extending between adjacent projections may be formed by flat facets forming surfaces of "V" or "U" shaped conformation. It should also be noted that the incident surfaces defining the inner surface of the main body have been shown in the accompanying figures as flat surfaces, although the possibility of curvilinear surfaces incident to each other is not excluded.

When using component 1, it is envisaged to place at least one end of a pipe or tubular portion, inside each press fitting 90. Subsequently, each press fitting 90 is radially compressed with a suitable tool or clamp: this action engages by mechanical interference the projections 9a, and optionally the internal projections 9b, to the external surface of the portion of pipe inserted in the press fitting, also compressing the gasket 12 between said external surface and the press fitting, thus achieving a mechanical coupling and a fluid seal between the main body 2 and the pipe.

According to an embodiment of the invention shown in FIGS. 1-3, the component 1 may be a valve or tap and thus comprise a shutter 10 housed within the main body inside the seat 25 and selectively movable at least between an open and a closed position. In particular, the shutter 10 is, for example, a ball body (alternatively, a gate valve shutter or other form of shutter may be used) provided with at least one through hole which, in the open and closed positions respectively allows and prevents the passage of fluid from the inlet 4 to the outlet 5. However, it is not excluded that the shutter 10 may be a partializer or a selector and consequently, in the closed position, allow a partial passage of fluid between the inlet 4 and the outlet 5.

The component 1 further comprises an operating rod 20 crossing the main body 2 and engaged at opposite ends to the shutter 10 and to a control member 21. In particular, the operating rod 20 is integrally movable by rotation with the shutter 10 and the control member 21, in order to move the shutter 10 between the first and second operating positions and vice versa, following a rotation of the control member by a user.

As, for example, shown in FIGS. 1 and 2, the operating rod 20 is housed inside a tubular collar 19 joined in one piece to the main body 2 and emerging externally to the latter.

The tubular collar 19 houses internally at least one sealing element 26, for example a gasket or an O-ring, radially interposed between the tubular collar itself and the operating rod 20, engaging in a fluid-tight manner a portion of the operating rod 20 and the main body 2. In fact, the operating rod, in cooperation with the sealing element, achieves a fluid-tight engagement between the shutter 10 and the control member.

The component 1 further comprises the mentioned control member 21, for example in the form of a lever or a knob, engaged at an end of the operating rod 20 outside the main body 2. The control member 21 is operable to rotate the operating rod 20 and move the shutter 10 between the open position and the closed position and vice versa. Of course it is not excluded that the shutter may take one or more intermediate positions between the open and closed positions, as it is customary in this type of components.

From a constructive point of view, the main body 2 may be made in one piece of either metallic material, or plastic material or composite material. In particular, the press fitting 90 referred to in the example described herein is made of cast iron.

Process of Manufacturing

It is also an object of the present invention to provide processes for manufacturing a component with press fitting according to the above description and/or according to any one of the accompanying claims.

In particular, the above-described and claimed component may, for example, be obtained as follows.

A first process involves making each of the elements 2a and 2b by molding; the steps of this first molding process include:
- providing a mold at least partially counter-shaped to the outer surface of the element 2a or 2b to be molded,
- inserting at least one punch or other insert, which is at least partially counter-shaped to the inner surface of the element 2a or 2b for defining a cavity interposed between the mold and the punch,
- inserting a predetermined amount of molding material, e.g. metallic material at liquid state such as cast iron, into the cavity,
- closing the mold,
- waiting for the solidification of the metal material placed in the cavity,
- removing one of the elements 2a, 2b obtained from the mold.

It should be noted how different molds must be used to make element 2a or element 2b, so that elements 2a, 2b can be engaged with each other.

Elements 2a, 2b may alternatively be manufactured by a second molding process comprising the steps of:
- providing two shells at least partially countershaped to the outer surface of one of the elements 2a, 2b;
- placing the two shells in contact with each other to define a hollow mold;
- placing a predetermined amount of molding material, e.g. metallic material at liquid state such as cast iron, into the cavity,
- waiting the solidification of the metal material placed in a cavity of the mold.

It should be noted that the two shells defining the mold can be made of powdered material (e.g. sand or silica-based material or other disposable powdered material) joined by a polymer resin matrix, so as to give a three-dimensional conformation to the shells themselves. Following the solidification phase of the metallic material, the shells are configured to shatter or otherwise lose their structural integrity at least in part: the second process may further comprise a phase of removing the shattered or powdered portions of the shells from the elements 2a, 2b.

Each of the first and second processes may further comprise a step of making the inner groove 11 on the inner surface of the elements 2a, 2b. In particular, such a step comprises forming the inner grooves 11 at the inlet 4 and the outlet 5, for example by means of removal of material (e.g. turning) of the elements 2a, 2b. It should be noted that the step of making the inner groove 11 defines the sharp edge at the junction section between the end wall and the top wall 23b of each projection 9a. The step of making the grove 11 may also serve for defining each internal projection 9b, separating projections 9a from the internal projections 9b. The process may further comprise a step of engaging a gasket 12 within each inner groove 11.

The first and second processes may further comprise a step of making the outer groove 13 by removal of material (e.g. turning) from the outer surface of the elements 2a, 2b.

The first and second processes may further comprise a step of making the seat 25 for the element 2a or the element 2b by removal of material (e.g. turning) from the outer surface of the elements 2a, 2b.

Following formation of each of the first and second elements 2a, 2b, the process may comprise a step of permanently engaging the same first and second elements 2a, 2b to each other, for example at threaded portions thereof.

According to an embodiment of the present invention, the component 1 may be a valve: the first and second processes, preferably prior to engagement of the elements 2a, 2b with each other, may in this case comprise further the steps of:
- engaging the operating rod inside the tubular collar 19 in a fluid-tight manner,
- engaging a sealing element 10a inside the seat 25 of the element 2a or the element 2b,
- inserting the shutter 10 inside the seat 25 in engagement with the tubular collar 19,
- engaging a further sealing element 10a inside the seat 25 of the other of the element 2a or the element 2b,
- engaging the elements 2a, 2b with each other in a fluid-tight manner, and
- engaging the control member or operating lever 21 to the operating rod 20.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). The terms "comprise" or "comprising" do not exclude other elements or steps, and the terms "a" or "one" do not exclude a plural number, unless expressly indicated otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A component with a press fitting including:
a main body having an inlet, an outlet and a channel placing in fluid communication the inlet with the outlet, and
the press fitting in correspondence of at least one of the outlet or the inlet of the main body, wherein the press fitting comprises a plurality of projections emerging internally from the main body and made in one piece with the main body,
wherein said projections emerge from an inner surface of the main body and longitudinally extend parallel to each other,
wherein each of said projections includes a respective terminal wall;
wherein an inner groove is defined on the inner surface of the main body and the inner groove has an annular conformation and is positioned adjacent to the projections;
wherein a plurality of internal projections each of which is distinct and axially spaced with respect to a respective one of said internal projections,
wherein each of said internal projections includes a respective terminal wall, and
wherein the terminal wall of each of said projections and the respective terminal wall of each of said internal projections face the inner groove.

2. The component according to claim 1, wherein the projections are offset from each other of an angle in a range of 5° to 120°;
wherein the longitudinal extension of each projection is in a range of 2 mm to 10 mm.

3. The component according to claim 1, wherein each projection is delimited by:
a top wall, opposite to the inner surface of the main body and having a tapered conformation approaching the main body; and
an end wall transverse to the top wall, said end wall being arranged at the inlet or the outlet of the main body and having a tapered conformation approaching the main body.

4. The component according to claim 3, wherein the terminal wall of each of the projections is transverse to the top wall and opposite to the end wall, wherein said terminal wall of each of the projections defines a sharp edge at a junction section with the top wall.

5. The component according to claim 1, wherein the inner groove has a longitudinal extension in a range of 3 mm to 15 mm along a direction parallel to the projections, and a depth in a range of 0.4 mm to 3 mm along a radial direction.

6. The component according to claim 1,
wherein the inner groove has, in longitudinal cross section, a rectangular shape.

7. The component according to claim 6, wherein the press fitting comprises at least one gasket having a substantially annular conformation, said gasket including:
a predetermined longitudinal extension, measured parallel to the projections, comprised between 3 mm and 15 mm, and
a predetermined thickness measured, orthogonally to a main body inner surface, comprised between 1 mm and 5 mm;
wherein the gasket is at least partially counter-shaped to the inner groove and at least partially housed within the same inner groove, said gasket having, in a cross section along a radial plane, a polygonal shape or a rectangular shape.

8. The component according to claim 7, wherein a ratio between a depth of the inner groove and the thickness of the gasket is in a range of 0.1 to 0.9.

9. The component according to claim 1, wherein the press fitting comprises at least one gasket including a substantially annular conformation, said gasket including:
a predetermined longitudinal extension in a range of 3 mm to 15 mm along a direction parallel to the projections, and
a predetermined thickness in a range of 1 mm to 5 mm along a direction orthogonal to a main body inner surface;
wherein the gasket is at least partially counter-shaped to the inner groove and at least partially housed within the same inner groove, said gasket includes, in a cross section along a radial plane, a polygonal shape or a rectangular shape.

10. The component according to claim 9, wherein a ratio between a depth of the inner groove and the thickness of the gasket is in a range of 0.1 to 0.9.

11. The component according to claim 1, wherein each one of the internal projections is axially aligned with a respective one of said projections.

12. The component according to claim 1, further comprising an outer groove defined on an outer surface of the main body on at least one between the inlet and the outlet of the main body, said outer groove being axially offset with respect to the inner groove, and being positioned between a central area of the main body and the press fitting.

13. The component according to claim 1, wherein the press fitting has a gripping edge in correspondence of at least one between the inlet and the outlet, said gripping edge being configured to radially deform in a direction approaching an axis of the main body.

14. The component according to claim 13, wherein the gripping edge has a plurality of protuberances radially emerging from an outer surface of the main body opposite the channel, said protuberances being angularly offset from each other by an angle in a range of 5 degrees to 120 degrees, wherein the protuberances are circumferentially spaced from each other by grooves axially extending over an entire width of the gripping edge.

15. The component according to claim 14, wherein said grooves comprise first grooves and second grooves alternating with each other, wherein the first grooves have a depth greater than a depth of the second grooves and the first grooves have a width smaller than a width of the second grooves, wherein said depth is measured radially and said width being measured circumferentially; and wherein each of the projections extends parallel to and in radial alignment with a corresponding one of said first grooves.

16. The component according to claim 14, wherein each one of the projections extends parallel to and in radial alignment with a corresponding one of said grooves.

17. The component according to claim 1 comprising:
a press fitting at each one of the inlet and the outlet, and
at least two outer grooves each defined in interposition between a respective press fitting and a central area of the main body.

18. The component according to claim 1, wherein the main body comprises at least two elements distinct from each other and fluid-tight engaged by means of a threaded coupling, each of said elements having a tapered conformation along the direction of an axis of the main body, wherein at least one shutter is operative within the channel of the main body and is selectively movable between at least one open position and one closed position, wherein said shutter, in the closed position, prevents passage of fluid between the inlet and the outlet, and in the open position allows passage of fluid between the inlet and the outlet; and
wherein the component further comprises at least one maneuvering rod crossing the main body and engaging the at least one shutter, said maneuvering rod being configured to move the at least one shutter from the open position to the closed position and vice versa.

19. A component with a press fitting including:
a main body having an inlet, an outlet and a channel placing in fluid communication the inlet with the outlet, and
the press fitting in correspondence of at least one of the outlet or the inlet of the main body, wherein the press fitting comprises:
a plurality of projections emerging internally from the main body and made in one piece with the main body, wherein said projections emerge from an inner surface of the main body and longitudinally extend parallel to each other,
a gripping edge in correspondence of at least one between the inlet and the outlet, said gripping edge configured to radially deform in a direction approaching an axis of the main body,
wherein the gripping edge has a plurality of protuberances radially emerging from an outer surface of the main body opposite the channel, said protuberances being angularly offset from each other by an angle in a range of 5 degrees to 120 degrees,
wherein the protuberances are circumferentially spaced from each other by grooves axially extending over an entire width of the gripping edge,
wherein said grooves comprise first grooves and second grooves alternating with each other,
wherein the first grooves have a depth greater than a depth of the second grooves,
wherein the first grooves have a width smaller than a width of the second grooves, said depth being measured radially and said width being measured circumferentially; and
wherein each of the projections extends parallel to and in radial alignment with a corresponding one of said first grooves.

20. A component with a press fitting including:
a main body having an inlet, an outlet and a channel placing in fluid communication the inlet with the outlet, and
the press fitting in correspondence of at least one of the outlet or the inlet of the main body, wherein the press fitting comprises:
a plurality of projections emerging internally from the main body and made in one piece with the main body, wherein said projections emerge from an inner surface of the main body and longitudinally extend parallel to each other,
a gripping edge in correspondence of at least one between the inlet and the outlet, said gripping edge configured to radially deform in a direction approaching an axis of the main body,
wherein the gripping edge has a plurality of protuberances radially emerging from an outer surface of the main body opposite the channel, said protuberances are angularly offset from each other by an angle in a range of 5 degrees to 120 degrees,
wherein the protuberances are circumferentially spaced from each other by grooves axially extending over an entire width of the gripping edge, and
wherein each of the projections extends parallel to and in radial alignment with a corresponding one of said grooves.

* * * * *